May 24, 1927. Re. 16,629

E. M. LANG, JR., 3D

FOOD PRESERVING CAN

Original Filed Aug. 23, 1921

INVENTOR
EDWARD M. LANG, JR.
BY Fetherstonhaugh & Co.
ATTORNEYS

Reissued May 24, 1927. Re. 16,629

UNITED STATES PATENT OFFICE.

EDWARD M. LANG, JR., 3D, OF PORTLAND, MAINE.

FOOD-PRESERVING CAN.

Original No. 1,540,406, dated June 2, 1925, Serial No. 494,667, filed August 23, 1921. Application for reissue filed January 15, 1926. Serial No. 81,571.

My invention relates to the food preserving can commonly known as the "sanitary" can in which the end sealing joints of the can are formed without solder. In cans of this type the body of the can is formed as a cylinder with an outwardly turned can sealing flange at each end.

The covers are formed, considering the can as set in a vertical position, with an upright annular inverted portion fitting into each end of the can body immediately inside of the can flange.

The cover also has a sealing flange connecting with said upright portion and the joint between the cover and the body of the can is formed by rolling or folding the cover flange and the can flange together and pressing them against the sides of the can to form what I term an involute joint.

In this joint, the can flange turns over and extends down parallel with the sides of the can and the cover flange turns downwardly over the turned-over can flange and then extends upward between the latter and the can body.

The line of the sealing joint thus extends upward between the upright portion of the cover and the upper end of the can, thence over the turned portion of the can flange, thence downwardly and around the lower edge of the can flange, thence upwardly and around the extreme edge of the cover flange and then downwardly between the cover flange and the body of the can to the open air.

In the operation of processing, when the cover is expanded or forced upward at its central portion by the expansion of the steam within the can, the lower part of the vertical annular portion of the cover is pulled away from its contact with the can body and the sealing joint above described is opened at its inner end. When the internal pressure is removed and the can is cooled the end of the can is forced inward but the open joint having once been formed the metal does not return to its original position. It thus happens that air is very likely to find its way into the interior of the can by reason of this imperfect closing of the joint.

The object of my invention is to so construct the can and its sealing joint that when the filled can is put through the operation of processing and pressure is generated in the interior of the can, the sealing joint will not open but will remain closed although the upright portion of the cover be moved away from its closed position.

I accomplish the first of the above stated objects by the use of a flexible metallic gasket formed of sufficient width to extend well down into the can and interposed between the can flange and the cover flange in such a way that it hugs tightly or is "hemmed" over the outside surface of the folded-over can flange and the inside surface of the top of the can body extending well down into the interior of the can.

When the joint is thus constructed, the expanding cover pulls the lower part of the upright portion of the cover out of position, the metallic gasket hugs the upper end of the can body and preserves the closeness of the joint at that point preventing any tendency to force open the sealing joint when the can is processed.

I have illustrated my invention by means of the accompanying drawing in which I show the ordinary sanitary can illustrating the various steps by which I apply the metallic gasket and complete the sealing joint and otherwise illustrating the common sealing or involute joint and the defect therein which my invention is intended to correct.

Referring to the drawings.

In Figures 1 to 5 I have illustrated the regular sanitary or involute joint by which the cover may be sealed to the can and the latter closed, with one way by which the gasket may be manipulated but it is to be understood that there may be numerous methods by which the joint may be assembled and finished.

Figure 7:
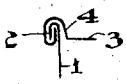
Figure 7 represents the joint forced open on the inside by the upward expansion of the central portion of the cover.
Figure 6:
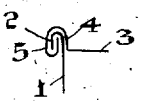
Figure 6 represents the usual involute joint.

Referring to the drawing, 1 represents the can body having the outwardly turned can flange at each end, 3 represents the cover body, 4 is the upright portion of the same which lies immediately within the can flange, 5 is the cover flange, 7 is the metal gasket and 6 is the hemmed over edge of the cover flange for confining the gasket in place. In Figures 6 and 7 I have illustrated the defect in the ordinary involute joint that my invention is designed to overcome. It will be seen that when the joint is complete, the upright portion 4 of the cover hugs closely the upper edge of the can body just inside of the can flange and this space between the portion 4 and the can constitutes the inner end of the sealing joint. When the center of the cover expands by the pressure from within, the upright portion 4 pulls away from the can body and opens up the inner end of the sealing joint.

According to the method I am illustrating herein for forming the joint, the circular gasket 7 is first placed beneath the cover flange and the outer edge of the flange is then hemmed down over the gasket so that the same is held firmly in place. The cover and the gasket may now be handled as a single article preliminary to the canning operation, the gasket remaining securely in place.

Figure 1:
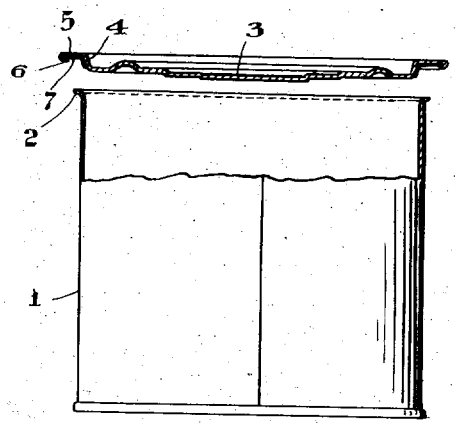
Figure 1 is a side elevation of the can with a vertical section through the cover and with the latter raised somewhat above the top of the can.
Figure 4:
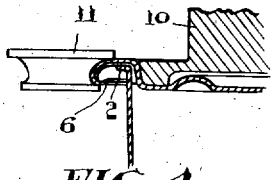
Figure 4 is a section illustrating the first operation of forming the joint.
Figure 5:
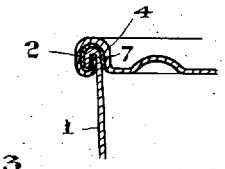
Figure 5 is the same showing the completed joint.

When the can is filled and the cover applied, the involute joint is rolled or formed with the gasket interposed between the can flange and the cover flange, the same as if no gasket was used, the flanges taking the same relative position as they would take without the gasket. In Figure 4 is illustrated the first step in the operation of forming the joint where the periphery of the cover flange is turned downwardly and inwardly. Figure 5 illustrates the completed joint with the metal gasket in place. It will be seen that the gasket after the joint is formed fits over the outside of the can flange and extends well down into the can between portion 4 and the upper end of the can. It is thus in position to hug the edge of the can and when the portion 4 pulls away it will keep the joint tightly closed.

While it is true that paper gaskets have been used in these joints, they do not extend down inside the can as does mine, and if they did, they would not perform the function of hugging the upper edge of the can thus keeping the joint closed.

The gasket is preferably made of relatively thin metal which has a considerable amount of flexibility. It should be well annealed and without spring but should have sufficient stiffness to hold firmly when once rolled or compressed in place.

The gasket is not necessarily an independent part but it may be made as an outward extension of the can flange or of the cover flange folded back to occupy the place of the gasket as described.

Figure 8:
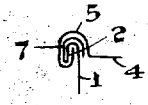
Figures 8 and 9 show two ways of doubling inwardly both the can flange and the cover flange. In the drawing, similar letters of reference indicate similar parts.
Figure 9:
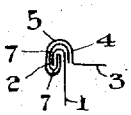
Figure 2:
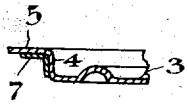
Figure 2 is a section through one side of the cover with the gasket laid in position.

In Figure 8 I have illustrated a sealing joint where the can flange or an outward extension thereof is folded back upon itself to form the gasket 7 and in Figure 9 I have shown a construction where the cover flange is folded back upon itself to form the gasket.

Figure 3:
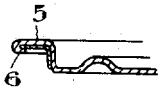
Figure 3 is the same with the cover flange hemmed over to hold the gasket in place.

In both these instances, the gasket occupies exactly the same position with regard to the can flange and cover flange as in Figure 5, except that in one case it is a continuation of the cover flange, and in the other a continuation of the can flange, and the effect of the gasket in the matter of preventing the opening of the sealing joint is substantially the same. In the modification shown in Figure 9 there is a further and different effect besides preventing the upright portion of the cover from moving away from the can body. If an opening is formed between the upright portion of the cover and the inner edge of the gasket the joint formed between the gasket which forms a portion of the cover flange and the adjacent portion of said cover flange if traced upwardly and outwardly will be found to terminate in a closed end or loop and not in the open air so that the danger of forming a leaky joint will be greatly reduced. When paper gaskets are used in the ordinary way they are not of much benefit but if the outer edge of the paper gasket is gripped by the hemmed over edge of the cover flange as shown in Figure 3 it is much more efficient and very often used with good effects.

Having thus described my invention, what I claim is:—

1. A food preserving can having an outwardly turned flange at one end and a cover for said can having an upright portion immediately inside of said can body and having a cover sealing flange connected with said upright portion and a relatively rigid metal gasket interposed between said can flange and cover flange, the said can flange, metal gasket and cover flange being rolled or folded together to form an involute sealing joint, said gasket gripping the joint and being wide enough to extend down into the interior of the can between said upright portion and the side of the can to prevent by its gripping action the opening of the sealing joint.

2. A food preserving can having an outwardly turned flange at one end and a cover for said can having an upright portion immediately inside of said can body and having a cover sealing flange connected with said upright portion and a relatively rigid metal gasket interposed between said can flange and cover flange, the said can flange, metal gasket and cover flange being rolled or folded together to form an involute sealing joint, said gasket gripping the can between said upright portion and the side of the can to prevent the opening of the sealing joint, said gasket being integral with the cover and forming a continuation of the cover flange.

3. A container cover having its peripheral portion folded upon itself to form a gasket.

4. A container cover provided with an underlying ring shaped gasket having its outer edge joined to the cover to form a marginal continuation thereof.

5. A metal container cover provided with a flange and a metal gasket united to and forming a reversely extending continuation of said flange.

6. A container comprising a body provided with a sealing flange, a cover provided with a sealing flange folded inwardly upon itself to form a gasket, said body flange, cover flange and gasket being rolled or folded together to form an involute joint, said gasket being wide enough to grip the body flange to prevent the opening of the sealing joint.

7. A container comprising a body provided with a sealing flange, a cover provided with a sealing flange, one of said flanges being folded upon itself to form a gasket, said flanges and gasket being rolled or folded together to form a sealing joint.

In witness whereof, I have hereunto set my hand.

EDWARD M. LANG, Jr., 3.